(12) United States Patent
Hoarau et al.

(10) Patent No.: US 10,373,756 B2
(45) Date of Patent: Aug. 6, 2019

(54) MALLEABLE TETS COIL WITH IMPROVED ANATOMICAL FIT

(71) Applicant: Thoratec Corporation, Pleasanton, CA (US)

(72) Inventors: Carine Hoarau, Lafayette, CA (US); Steven Reichenbach, Pleasanton, CA (US); Don Hannula, San Luis Obispo, CA (US)

(73) Assignee: TC1 LLC, Pleasanton, CA (US)

( * ) Notice: Subject to any disclaimer, the term of this patent is extended or adjusted under 35 U.S.C. 154(b) by 767 days.

(21) Appl. No.: 14/217,085

(22) Filed: Mar. 17, 2014

(65) Prior Publication Data

US 2014/0265620 A1    Sep. 18, 2014

Related U.S. Application Data

(60) Provisional application No. 61/794,045, filed on Mar. 15, 2013.

(51) Int. Cl.
*H01F 38/14* (2006.01)
*H02J 7/02* (2016.01)
(Continued)

(52) U.S. Cl.
CPC .............. *H01F 38/14* (2013.01); *H01F 3/10* (2013.01); *H01F 3/14* (2013.01); *H01F 27/02* (2013.01);
(Continued)

(58) Field of Classification Search
CPC .......... H01F 27/02; H01F 27/26; H01F 27/28; H01F 27/306; H01F 3/10; H01F 3/14;
(Continued)

(56) References Cited

U.S. PATENT DOCUMENTS

| 4,041,955 | A | 8/1977 | Kelly et al. |
| 4,352,960 | A | 10/1982 | Dormer et al. |

(Continued)

FOREIGN PATENT DOCUMENTS

| DE | 202012000166 U1 | 6/2013 |
| DE | 102012201073 A1 | 7/2013 |

(Continued)

OTHER PUBLICATIONS

Bonde et al.; Promise of unrestricted mobility with innovative, portable wireless powering of a mechanical circulatory assist device; American Association for Thoracic Surgery; © 2012; 2 pgs.; retrieved Mar. 12, 2014 from the internet: http://aats.org/annualmeeting/Abstracts/2012/T8.cgi.

(Continued)

*Primary Examiner* — Jared Fureman
*Assistant Examiner* — Aqeel H Bukhari
(74) *Attorney, Agent, or Firm* — Armstrong Teasdale LLP

(57) ABSTRACT

Systems and methods for wireless energy transfer are described. A transmitter unit has a transmitter resonator with a coil that is coupled to a power supply to wirelessly transmit power to a receiver unit. A receiver unit has a receiver resonator with a coil coupled to a device load. At least one of the resonators is a malleable, non-planar resonator that can be bent and shaped to conform to a patient's anatomy.

17 Claims, 10 Drawing Sheets

(51) Int. Cl.
*H02J 50/40* (2016.01)
*H02J 50/70* (2016.01)
*H01F 3/10* (2006.01)
*H01F 3/14* (2006.01)
*H01F 27/02* (2006.01)
*H01F 27/26* (2006.01)
*H01F 27/28* (2006.01)
*H01F 27/30* (2006.01)
*H04B 5/00* (2006.01)
*H02J 50/12* (2016.01)
*H01F 27/255* (2006.01)

(52) U.S. Cl.
CPC ............. *H01F 27/26* (2013.01); *H01F 27/28* (2013.01); *H01F 27/306* (2013.01); *H02J 7/025* (2013.01); *H02J 50/12* (2016.02); *H02J 50/40* (2016.02); *H02J 50/70* (2016.02); *H04B 5/0037* (2013.01); *H04B 5/0081* (2013.01); *H01F 27/255* (2013.01)

(58) Field of Classification Search
CPC ........ H01F 38/14; H01F 27/255; H02J 50/12; H04B 5/0037; H04B 5/0081
See application file for complete search history.

(56) References Cited

U.S. PATENT DOCUMENTS

| | | |
|---|---|---|
| 4,561,443 A | 12/1985 | Hogrefe et al. |
| 4,561,444 A | 12/1985 | Livingston et al. |
| 4,630,615 A | 12/1986 | Yomtov |
| 4,679,560 A | 7/1987 | Galbraith |
| 4,726,378 A | 2/1988 | Kaplan |
| 4,736,747 A | 4/1988 | Drake |
| 4,924,171 A | 5/1990 | Baba et al. |
| 4,945,305 A | 7/1990 | Blood |
| 5,070,223 A | 12/1991 | Colasante |
| 5,346,458 A | 9/1994 | Affeld |
| 5,350,413 A | 9/1994 | Miller |
| 5,569,156 A | 10/1996 | Mussivand |
| 5,630,836 A | 5/1997 | Prem et al. |
| 5,690,693 A | 11/1997 | Wang et al. |
| 5,702,431 A | 12/1997 | Wang et al. |
| 5,755,748 A | 5/1998 | Borza |
| 5,771,438 A | 6/1998 | Palermo et al. |
| 5,831,248 A | 11/1998 | Hojyo et al. |
| 5,948,006 A | 9/1999 | Mann |
| 6,123,726 A | 9/2000 | Mori et al. |
| 6,149,683 A | 11/2000 | Lancisi et al. |
| 6,212,430 B1 | 4/2001 | Kung |
| 6,296,533 B1 | 10/2001 | Grubbs et al. |
| 6,312,338 B1 | 11/2001 | Sato et al. |
| 6,320,354 B1 | 11/2001 | Sengupta et al. |
| 6,324,431 B1 | 11/2001 | Zarinetchi et al. |
| 6,327,504 B1 | 12/2001 | Dolgin et al. |
| 6,389,318 B1 | 5/2002 | Zarinetchi et al. |
| 6,400,991 B1 | 6/2002 | Kung |
| 6,442,434 B1 | 8/2002 | Zarinetchi et al. |
| 6,451,055 B1 | 9/2002 | Weiss |
| 6,458,164 B1 | 10/2002 | Weiss |
| 6,478,820 B1 | 11/2002 | Weiss |
| 6,553,263 B1 | 4/2003 | Meadows et al. |
| 6,579,315 B1 | 6/2003 | Weiss |
| 6,591,139 B2 | 7/2003 | Loftin et al. |
| 6,605,032 B2 | 8/2003 | Benkowski et al. |
| 6,647,298 B2 | 11/2003 | Abrahamson et al. |
| 6,650,213 B1 | 11/2003 | Sakurai et al. |
| 6,723,039 B2 | 4/2004 | French et al. |
| 6,772,011 B2 | 8/2004 | Dolgin |
| 6,801,807 B2 | 10/2004 | Abrahamson |
| 6,810,289 B1 | 10/2004 | Shaquer |
| 6,850,803 B1 | 2/2005 | Jimenez et al. |
| 6,894,456 B2 | 5/2005 | Tsukamoto et al. |
| 6,895,281 B1 | 5/2005 | Amundson et al. |
| 6,949,065 B2 | 9/2005 | Sporer et al. |
| 6,960,968 B2 | 11/2005 | Odendaal et al. |
| 6,967,621 B1 | 11/2005 | Cadotte, Jr. et al. |
| 6,985,773 B2 | 1/2006 | Von Arx et al. |
| 7,015,769 B2 | 3/2006 | Schulman et al. |
| 7,107,103 B2 | 9/2006 | Schulman et al. |
| 7,126,310 B1 | 10/2006 | Barron |
| 7,225,032 B2 | 5/2007 | Schmeling et al. |
| 7,246,040 B2 | 7/2007 | Borg et al. |
| 7,286,880 B2 | 10/2007 | Olson et al. |
| 7,428,438 B2 | 9/2008 | Parramon et al. |
| 7,471,986 B2 | 12/2008 | Hatlestad |
| 7,496,733 B2 | 2/2009 | Altman et al. |
| 7,505,816 B2 | 3/2009 | Schmeling et al. |
| 7,515,012 B2 | 4/2009 | Schulman et al. |
| 7,522,878 B2 | 4/2009 | Baarman |
| 7,532,901 B1 | 5/2009 | LaFranchise et al. |
| 7,565,187 B1 | 7/2009 | Dynok et al. |
| 7,571,007 B2 | 8/2009 | Erickson et al. |
| 7,574,173 B2 | 8/2009 | Terranova et al. |
| 7,587,241 B2 | 9/2009 | Parramon et al. |
| 7,599,743 B2 | 10/2009 | Hassler et al. |
| 7,650,187 B2 | 1/2010 | Gruber et al. |
| 7,650,192 B2 | 1/2010 | Wahlstrand |
| 7,711,433 B2 | 5/2010 | Davis et al. |
| 7,720,546 B2 | 5/2010 | Ginggen et al. |
| 7,741,734 B2 | 6/2010 | Joannopoulos et al. |
| 7,761,164 B2 | 7/2010 | Verhoef et al. |
| 7,774,069 B2 | 8/2010 | Olson et al. |
| 7,782,190 B1 | 8/2010 | Martin et al. |
| 7,805,200 B2 | 9/2010 | Kast et al. |
| 7,812,481 B2 | 10/2010 | Iisaka et al. |
| 7,818,036 B2 | 10/2010 | Lair et al. |
| 7,818,037 B2 | 10/2010 | Lair et al. |
| 7,825,543 B2 | 11/2010 | Karalis et al. |
| 7,830,114 B2 | 11/2010 | Reed |
| 7,865,245 B2 | 1/2011 | Torgerson et al. |
| 7,872,367 B2 | 1/2011 | Recksiek et al. |
| 7,904,170 B2 | 3/2011 | Harding |
| 7,932,696 B2 | 4/2011 | Peterson |
| 7,962,222 B2 | 6/2011 | He et al. |
| RE42,682 E | 9/2011 | Barreras et al. |
| 8,076,801 B2 | 12/2011 | Karalis et al. |
| 8,081,925 B2 | 12/2011 | Parramon et al. |
| 8,096,954 B2 | 1/2012 | Stahmann et al. |
| 8,140,168 B2 | 3/2012 | Olson et al. |
| 8,150,529 B2 | 4/2012 | Snell et al. |
| 8,165,694 B2 | 4/2012 | Carbanaru et al. |
| 8,185,212 B2 | 5/2012 | Carbunaru et al. |
| 8,193,766 B2 | 6/2012 | Rondoni et al. |
| 8,203,434 B2 | 6/2012 | Yoshida |
| 8,244,367 B2 | 8/2012 | Wahlstrand et al. |
| 8,247,926 B2 | 8/2012 | Issa et al. |
| 8,258,653 B2 | 9/2012 | Kitamura et al. |
| 8,265,770 B2 | 9/2012 | Toy et al. |
| 8,278,784 B2 | 10/2012 | Cook et al. |
| 8,292,052 B2 | 10/2012 | Bohori et al. |
| 8,299,652 B2 | 10/2012 | Sample et al. |
| 8,301,079 B2 | 10/2012 | Baarman |
| 8,319,473 B2 | 11/2012 | Choi et al. |
| 8,362,742 B2 | 1/2013 | Kallmyer |
| 8,373,310 B2 | 2/2013 | Baarman et al. |
| 8,378,522 B2 | 2/2013 | Cook et al. |
| 8,378,523 B2 | 2/2013 | Cook et al. |
| 8,463,395 B2 | 6/2013 | Forsell |
| 8,489,200 B2 | 7/2013 | Zarinetchi et al. |
| 8,551,163 B2 | 10/2013 | Aber et al. |
| 8,562,508 B2 | 10/2013 | Dague et al. |
| 8,581,793 B2 | 11/2013 | Carr |
| 8,587,154 B2 | 11/2013 | Fells et al. |
| 8,620,447 B2 | 12/2013 | D'Ambrosio et al. |
| 8,628,460 B2 | 1/2014 | Yomtov et al. |
| 8,629,578 B2 | 1/2014 | Kurs et al. |
| 8,668,473 B2 | 3/2014 | Larose et al. |
| 8,694,117 B2 | 4/2014 | Aghassian et al. |
| 8,810,071 B2 | 8/2014 | Sauerlaender et al. |
| 8,884,468 B2 | 11/2014 | Lemmens et al. |
| 8,909,351 B2 | 12/2014 | Dinsmoor et al. |
| 8,971,958 B2 | 3/2015 | Frikart et al. |

(56) References Cited

U.S. PATENT DOCUMENTS

| | | | |
|---|---|---|---|
| 9,002,468 B2 | 4/2015 | Shea et al. | |
| 9,079,043 B2* | 7/2015 | Stark | A61N 1/3787 |
| 9,106,083 B2 | 8/2015 | Partovi | |
| 9,192,704 B2 | 11/2015 | Yomtov et al. | |
| 9,302,093 B2 | 4/2016 | Mashiach | |
| 9,515,494 B2 | 12/2016 | Kurs et al. | |
| 9,515,495 B2 | 12/2016 | Kurs et al. | |
| 9,560,787 B2 | 1/2017 | Kallmyer et al. | |
| 2002/0038138 A1 | 3/2002 | Zarinetchi et al. | |
| 2002/0087204 A1* | 7/2002 | Kung | A61N 1/3787 607/61 |
| 2002/0093456 A1 | 7/2002 | Sawamura et al. | |
| 2003/0171792 A1 | 9/2003 | Zarinetchi et al. | |
| 2004/0138725 A1 | 7/2004 | Forsell | |
| 2004/0256146 A1 | 12/2004 | Frericks | |
| 2005/0006083 A1 | 1/2005 | Chen et al. | |
| 2005/0288743 A1 | 12/2005 | Ahn et al. | |
| 2006/0199997 A1 | 9/2006 | Hassler et al. | |
| 2006/0271129 A1 | 11/2006 | Tai et al. | |
| 2007/0096686 A1 | 5/2007 | Jimenez et al. | |
| 2007/0123948 A1 | 5/2007 | Dal Molin | |
| 2007/0141869 A1* | 6/2007 | McNeely | A61B 5/0006 439/76.1 |
| 2007/0142696 A1 | 6/2007 | Crosby et al. | |
| 2007/0191706 A1 | 8/2007 | Calderon et al. | |
| 2008/0009198 A1 | 1/2008 | Marino | |
| 2008/0027293 A1 | 1/2008 | Vodermayer et al. | |
| 2008/0054638 A1 | 3/2008 | Greene et al. | |
| 2008/0100294 A1 | 5/2008 | Rohling et al. | |
| 2008/0149736 A1 | 6/2008 | Kim et al. | |
| 2008/0167531 A1 | 7/2008 | McDermott | |
| 2008/0211320 A1 | 9/2008 | Cook et al. | |
| 2009/0018616 A1 | 1/2009 | Quick et al. | |
| 2009/0051224 A1 | 2/2009 | Cook et al. | |
| 2009/0072628 A1 | 3/2009 | Cook et al. | |
| 2009/0081943 A1 | 3/2009 | Dobyns et al. | |
| 2009/0174264 A1 | 7/2009 | Onishi et al. | |
| 2009/0212736 A1 | 8/2009 | Baarman et al. | |
| 2009/0226328 A1 | 9/2009 | Morello | |
| 2009/0270679 A1 | 10/2009 | Hoeg et al. | |
| 2009/0284220 A1 | 11/2009 | Toncich et al. | |
| 2010/0019985 A1 | 1/2010 | Bashyam et al. | |
| 2010/0033021 A1 | 2/2010 | Bennett | |
| 2010/0035453 A1 | 2/2010 | Tronnes et al. | |
| 2010/0045114 A1 | 2/2010 | Sample et al. | |
| 2010/0063347 A1 | 3/2010 | Yomtov et al. | |
| 2010/0066305 A1 | 3/2010 | Takahashi et al. | |
| 2010/0069992 A1 | 3/2010 | Aghassian et al. | |
| 2010/0109958 A1 | 5/2010 | Haubrich et al. | |
| 2010/0114143 A1 | 5/2010 | Albrecht et al. | |
| 2010/0122995 A1 | 5/2010 | Thomas et al. | |
| 2010/0171368 A1 | 7/2010 | Schatz et al. | |
| 2010/0184371 A1 | 7/2010 | Cook et al. | |
| 2010/0194334 A1 | 8/2010 | Kirby et al. | |
| 2010/0210233 A1 | 8/2010 | Cook et al. | |
| 2010/0211134 A1 | 8/2010 | Forsell | |
| 2010/0222848 A1 | 9/2010 | Forsell | |
| 2010/0222849 A1 | 9/2010 | Forsell | |
| 2010/0225174 A1* | 9/2010 | Jiang | A61N 1/3787 307/104 |
| 2010/0244576 A1 | 9/2010 | Hillan et al. | |
| 2010/0253340 A1* | 10/2010 | Corum | G01R 33/4816 324/309 |
| 2010/0256708 A1 | 10/2010 | Thornton et al. | |
| 2010/0277121 A1 | 11/2010 | Hall et al. | |
| 2010/0308939 A1 | 12/2010 | Kurs | |
| 2010/0314946 A1 | 12/2010 | Budde et al. | |
| 2010/0331917 A1* | 12/2010 | DiGiore | A61N 1/08 607/61 |
| 2010/0331919 A1 | 12/2010 | DiGiore et al. | |
| 2011/0025132 A1 | 2/2011 | Sato | |
| 2011/0043050 A1 | 2/2011 | Yabe et al. | |
| 2011/0046699 A1 | 2/2011 | Mazanec | |
| 2011/0057607 A1 | 3/2011 | Carobolante | |
| 2011/0101790 A1 | 5/2011 | Budgett | |
| 2011/0109263 A1 | 5/2011 | Sakoda et al. | |
| 2011/0115431 A1 | 5/2011 | Dunworth et al. | |
| 2011/0127848 A1 | 6/2011 | Ryu et al. | |
| 2011/0148215 A1 | 6/2011 | Marzetta et al. | |
| 2011/0178361 A1 | 7/2011 | Yomtov | |
| 2011/0181235 A1 | 7/2011 | Walley et al. | |
| 2011/0205083 A1 | 8/2011 | Janna et al. | |
| 2011/0218383 A1* | 9/2011 | Broen | A61M 1/127 600/16 |
| 2011/0234155 A1 | 9/2011 | Chen et al. | |
| 2011/0241436 A1 | 10/2011 | Furukawa | |
| 2011/0245892 A1 | 10/2011 | Kast et al. | |
| 2011/0266880 A1 | 11/2011 | Kim et al. | |
| 2011/0276110 A1 | 11/2011 | Whitehurst et al. | |
| 2011/0278948 A1 | 11/2011 | Forsell | |
| 2011/0291489 A1 | 12/2011 | Tsai et al. | |
| 2011/0291613 A1 | 12/2011 | Rosik et al. | |
| 2011/0295345 A1 | 12/2011 | Wells et al. | |
| 2011/0298294 A1 | 12/2011 | Takada et al. | |
| 2011/0301667 A1 | 12/2011 | Olson et al. | |
| 2011/0313238 A1 | 12/2011 | Reichenbach et al. | |
| 2012/0001485 A1 | 1/2012 | Uchida | |
| 2012/0032522 A1 | 2/2012 | Schatz et al. | |
| 2012/0039102 A1 | 2/2012 | Shinoda | |
| 2012/0057322 A1 | 3/2012 | Waffenschmidt | |
| 2012/0065458 A1 | 3/2012 | Tol | |
| 2012/0080957 A1 | 4/2012 | Cooper et al. | |
| 2012/0091951 A1 | 4/2012 | Sohn | |
| 2012/0104997 A1 | 5/2012 | Carobolante | |
| 2012/0109256 A1 | 5/2012 | Meskins et al. | |
| 2012/0119914 A1 | 5/2012 | Uchida | |
| 2012/0146575 A1 | 6/2012 | Armstrong et al. | |
| 2012/0149229 A1 | 6/2012 | Kearsley et al. | |
| 2012/0150259 A1 | 6/2012 | Meskens | |
| 2012/0153739 A1 | 6/2012 | Cooper | |
| 2012/0153954 A1 | 6/2012 | Ota et al. | |
| 2012/0157753 A1 | 6/2012 | D'Ambrosio | |
| 2012/0157754 A1 | 6/2012 | D'Ambrosio | |
| 2012/0158407 A1 | 6/2012 | Forsell | |
| 2012/0161539 A1 | 6/2012 | Kim et al. | |
| 2012/0164943 A1 | 6/2012 | Bennett | |
| 2012/0169132 A1 | 7/2012 | Choudhary et al. | |
| 2012/0169133 A1 | 7/2012 | Lisi et al. | |
| 2012/0169137 A1 | 7/2012 | Lisi et al. | |
| 2012/0169139 A1 | 7/2012 | Kudo | |
| 2012/0169278 A1 | 7/2012 | Choi et al. | |
| 2012/0175967 A1 | 7/2012 | Dibben et al. | |
| 2012/0235364 A1 | 9/2012 | Wang et al. | |
| 2012/0235634 A1* | 9/2012 | Hall | H03H 7/40 320/108 |
| 2012/0239118 A1 | 9/2012 | Ozawa et al. | |
| 2012/0245649 A1 | 9/2012 | Bohori et al. | |
| 2012/0245664 A1 | 9/2012 | Smith et al. | |
| 2012/0259398 A1 | 10/2012 | Chen et al. | |
| 2012/0274148 A1 | 11/2012 | Sung et al. | |
| 2012/0306433 A1* | 12/2012 | Kim | H02J 17/00 320/106 |
| 2013/0007949 A1 | 1/2013 | Kurs et al. | |
| 2013/0060103 A1 | 3/2013 | Bergida et al. | |
| 2013/0119773 A1 | 5/2013 | Davis | |
| 2013/0127253 A1 | 5/2013 | Stark et al. | |
| 2013/0149960 A1 | 6/2013 | Dec et al. | |
| 2013/0159956 A1 | 6/2013 | Verghese et al. | |
| 2013/0190551 A1 | 7/2013 | Callaway et al. | |
| 2013/0197607 A1 | 8/2013 | Wilder et al. | |
| 2013/0214731 A1 | 8/2013 | Dinsmoor | |
| 2013/0241306 A1 | 9/2013 | Aber et al. | |
| 2013/0241468 A1 | 9/2013 | Moshfeghi | |
| 2013/0271088 A1 | 10/2013 | Hwang et al. | |
| 2013/0289334 A1 | 10/2013 | Badstibner et al. | |
| 2013/0310630 A1 | 11/2013 | Smith et al. | |
| 2013/0320773 A1 | 12/2013 | Schatz et al. | |
| 2013/0331638 A1 | 12/2013 | Cameron et al. | |
| 2014/0005466 A1 | 1/2014 | Crosby et al. | |
| 2014/0011447 A1 | 1/2014 | Konanur et al. | |
| 2014/0028110 A1 | 1/2014 | Petersen et al. | |
| 2014/0028111 A1 | 1/2014 | Hansen et al. | |
| 2014/0031606 A1 | 1/2014 | Hansen et al. | |

(56) References Cited

U.S. PATENT DOCUMENTS

| | | |
|---|---|---|
| 2014/0152252 A1 | 6/2014 | Wood |
| 2014/0163644 A1 | 6/2014 | Scott et al. |
| 2014/0265621 A1 | 9/2014 | Wong et al. |
| 2014/0275727 A1 | 9/2014 | Bonde et al. |
| 2015/0123654 A1 | 5/2015 | Gagnon et al. |
| 2015/0229289 A1 | 8/2015 | Suzuki |
| 2015/0290373 A1 | 10/2015 | Rudser et al. |
| 2016/0135684 A1* | 5/2016 | Kappel ............... A61B 5/0015 600/301 |
| 2016/0218432 A1* | 7/2016 | Pope ..................... H01Q 1/243 |
| 2016/0250484 A1 | 9/2016 | Nguyen et al. |
| 2016/0254703 A1 | 9/2016 | Hansen |
| 2016/0254704 A1 | 9/2016 | Hansen et al. |

FOREIGN PATENT DOCUMENTS

| | | |
|---|---|---|
| EP | 0589608 A2 | 9/1993 |
| EP | 1513241 A1 | 3/2005 |
| EP | 2267864 A2 | 6/2010 |
| GB | 2477034 A | 7/2011 |
| JP | H03109063 A | 5/1991 |
| JP | 11-506646 | 6/1999 |
| JP | 2013094456 A | 5/2013 |
| JP | 2013161640 A | 8/2013 |
| JP | 2014160611 A | 9/2014 |
| KR | 1020020089605 | 11/2002 |
| KR | 1020120007296 | 1/2012 |
| KR | 1020120077448 | 7/2012 |
| WO | 0001442 A2 | 1/2000 |
| WO | WO00/74747 A1 | 12/2000 |
| WO | WO01/37926 A1 | 5/2001 |
| WO | WO2005/106901 A2 | 11/2005 |
| WO | 2007053881 A1 | 5/2007 |
| WO | WO2008/066941 A2 | 6/2008 |
| WO | WO2009/018271 A1 | 2/2009 |
| WO | WO2009/021220 A1 | 2/2009 |
| WO | WO2009/023905 A1 | 2/2009 |
| WO | WO2009/042977 A1 | 4/2009 |
| WO | WO2010/030378 A1 | 3/2010 |
| WO | WO2010/089354 A2 | 8/2010 |
| WO | 2011081626 A1 | 7/2011 |
| WO | WO2011/113934 A1 | 9/2011 |
| WO | WO2012/002063 A1 | 1/2012 |
| WO | WO2012/056365 A2 | 5/2012 |
| WO | WO2012/087807 A2 | 6/2012 |
| WO | WO2012/087811 A2 | 6/2012 |
| WO | WO2012/087816 A2 | 6/2012 |
| WO | WO2012/087819 A2 | 6/2012 |
| WO | 2012099965 A2 | 7/2012 |
| WO | WO2012/141752 A2 | 10/2012 |
| WO | 2013110602 A1 | 8/2013 |
| WO | WO2013/138451 A1 | 9/2013 |
| WO | WO2014/039673 A1 | 3/2014 |

OTHER PUBLICATIONS

Chargepoint, Inc.; −chargepoin+®; product brochure; 4 pgs.; © 2014; retrieved Mar. 12, 2014 from the internet: http://www.chargepoint.com/network/.

Dixon, Jr.; Eddy current losses in transformer windings and circuit wiring; Unitrode Corp. Seminar Manual (SEM600); Watertown, MA; 12 pgs.; 1988 (year of pub. sufficiently earlier than effective US filing date and any foreign priority date).

Evatran; PluglessTM Level 2 EV Charging System (3.3kW); product brochure; 7 pgs.; retrieved Mar. 12, 2014 from the internet: http://www.pluglesspower.com/tech-specs/.

Ferret, B.; Electric vehicles get big boost!; Renewable Energy World; 3 pgs.; Jul. 30, 2012; retrieved Jul. 30, 2012 from the internet: http://www.renewableenergyworld.com/rea/blog/post/2012/07/.

Motavalli, Jim; WiTricity Takes Its Car-Charging Technology Out for a Road Test; New York Times; 3 pgs.; Jul. 25, 2012; retrieved Mar. 12, 2014 from the internet: http://wheels.blogs.nytimes.com/2012/07/25/witricity-takes-its-car-charging-technology-out-for-a-road-test/.

Petersen et al.; U.S. Appl. No. 14/414,708 entitled "Wireless Battery Charging," filed Jan. 14, 2015.

Petersen, E.; U.S. Appl. No. 14/414,820 entitled "Variable Capacitor for Resonant Power Transfer Systems," filed Jan. 14, 2015.

Petersen, E.; U.S. Appl. No. 14/414,823 entitled "Resonant Power Transfer System and Method of Estimating System State," filed Jan. 14, 2015.

Hansen, J.; U.S. Appl. No. 14/414,832 entitled "Resonant Power Transfer Systems With Protective Algorithm," filed Jan. 14, 2015.

Petersen et al.; U.S. Appl. No. 14/414,840 entitled "Computer Modeling for Resonant Power Transfer Systems," filed Jan. 14, 2015.

Hansen, J.; U.S. Appl. No. 14/414,842 entitled "Resonant Power Transmission Coils and Systems," filed Jan. 14, 2015.

Development and Implementation of RFID Technology, Ed. Cristina Turcu, Feb. 2009, pp. 28-30, 93-97.

Merli, Francesco, et al., "Design, Realization and Measurements of a Miniature Antenna for Implantable Wireless Communication Systems", IEEE Transaction on Antennas and Propagation, vol. 59, No. 10, Oct. 2011, pp. 3544-3555.

Merli, Francesco, et al.,"The Effect of Insulating Layers on the Performance of Implanted Antennas", IEEE Transaction on Antennas and Propagation, vol. 59, No. 1, Jan. 2011, pp. 21-31.

Abadia, Javier, et al., 3D-Spiral Small Antenna Design and Realization for Biomdical Telemetry in the MICS Band. Radioengineering, vol. 18, No. 4, Dec. 2009, pp. 359-367.

Notification of Transmittal of the International Search Report and the Written Opinion of the International Searching Authority for PCT Application No. PCT/US2015/051474, dated Dec. 30, 2015.

\* cited by examiner $$Ic \approx \frac{A_2}{A_1}$$

MALLEABLE TETS COIL WITH IMPROVED ANATOMICAL FIT

CROSS-REFERENCE TO RELATED APPLICATIONS

This application claims the benefit of U.S. Provisional Patent Application No. 61/794,045, filed on Mar. 15, 2013, titled "Malleable TETS Coil with Improved Anatomical Fit", the contents of which are incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

FIELD

The field relates generally to resonant wireless power transfer systems, and more specifically to implantable resonant wireless power transfer systems.

BACKGROUND

Many implantable medical devices require electrical systems to power the implant. Typically, this is achieved using percutaneous wiring to connect a power source to the implant.

More recently, there has been development into powering an implanted device wirelessly with a Transcutaneous Energy Transfer (TET) system, e.g., through an oscillating magnetic field. For a TET system to be useful, electrical energy storage and processing must be provided when external power is interrupted or not available. This electrical energy processing and storage can be implemented with solid-state electronics and a battery.

Typically, implantable medical devices, such as implanted sensors, require very little power to operate. With such low power levels (on the order of milliwatts), power transfer levels and efficiency can be lower. With higher power devices (e.g., on the order of watts and up to 15 W or more), efficient transfer of wireless power is extremely important. Additionally, positions within the body are limited that can accommodate larger implanted devices, some of which are deep below the skin surface. These implant locations require additional attention to position and orientation of both the transmit and receive coils, as well as techniques to improve and maximize transfer efficiency.

Previous TET systems for implantable medical devices required the implanted receiver coil to be positioned just under the skin, and typically include a mechanical feature to align the receive and transmit coils and keep them together. By implanting these devices directly under the skin, the size and power requirements of these implanted devices is limited if they are to be powered by a TET system.

SUMMARY OF THE DISCLOSURE

A resonator of a wireless power transfer system is provided, comprising a flexible housing, a flexible conductor layer disposed in the housing, and a flexible ferrite layer disposed in the housing.

In some embodiments, the resonator is configured to bend to substantially conform to the anatomy of a patient. In some embodiments, the resonator is configured to conform to an abdomen of the patient. In another embodiment, the resonator is configured to conform to a chest of the patient.

In some embodiments, the flexible ferrite layer comprises a plurality of ferrite beads disposed on a flexible substrate. In another embodiment, the flexible ferrite layer comprises a plurality of ferrite tiles disposed on a flexible substrate. In some embodiments, the flexible ferrite layer comprises a plurality of ferrite tiles having different shapes and sizes. In another embodiment, the flexible ferrite layer comprises at least two sections, a first section having a first minimum bend radius, and a second section having a second minimum bend radius smaller than the first minimum bend radius.

In one embodiment, the flexible conductor layer comprises a resonator coil.

In another embodiment, the resonator coil is coupled to a power supply and configured to transmit wireless energy.

In some embodiments, the resonator coil is configured to receive wireless energy.

In some embodiments, the flexible conductor layer comprises at least one transmit coil and at least one receive coil.

In one embodiment, the flexible conductor layer comprises at least one transmit coil, at least one receive coil, and at least one exciter coil.

In some embodiments, the housing comprises silicone. In another embodiment, the housing comprises a first section and a second section, the first section having a groove configured to hold the flexible conductor layer and the flexible ferrite layer.

In some embodiments, the housing comprises a circular shape, a rectangular shape, an elliptical shape, or a saddle shape.

In some embodiments, the resonator is bendable into a non-planar configuration.

A system for wireless energy transfer is provided, comprising a transmitter unit comprising a transmitter resonator coil coupled to a power supply and configured to transmit wireless energy, the transmitter resonator coil being malleable so as to be conformable to a patient's anatomy; and a receiver unit comprising a receiver resonator coil coupled to a device load, wherein the receiver unit is configured to receive the wireless energy from the transmitter unit and supply the received energy to the device load.

In some embodiments, the system further comprises a flexible ferrite layer disposed in the transmitter unit and configured to prevent magnetic flux from flowing in undesired directions.

In one embodiment, the flexible ferrite layer comprises a plurality of ferrite beads disposed on a flexible substrate. In another embodiment, the flexible ferrite layer comprises a plurality of ferrite tiles disposed on a flexible substrate.

In some embodiments, the transmitter resonator coil comprises a plurality of transmit coils. In another embodiment, the transmitter resonator coil comprises at least one transmit coil and at least one receive coil. In some embodiments, the transmitter resonator coil comprises at least one transmit coil, at least one receive coil, and at least one exciter coil.

In alternative embodiments, the transmitter resonator coil is bendable into a non-planar configuration.

A method of transmitting and receiving wireless energy is provided, comprising conforming a malleable transmitter coil to a patient, transmitting wireless energy from the malleable transmitter coil into the patient, receiving the wireless energy with a receiver coil implanted in the patient, and delivering the received energy to a device load in the patient.

A method of transmitting and receiving wireless energy is also provided, comprising transmitting wireless energy from a transmitter coil into a patient, receiving the wireless energy with a malleable receiver coil implanted in the patient, and delivering the received energy to a device load in the patient.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
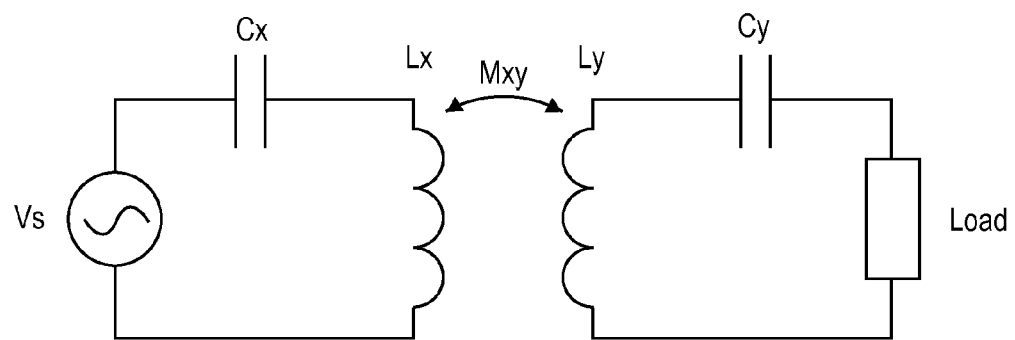
FIG. 1 illustrates a basic wireless power transfer system.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Various aspects of the invention are similar to those described in International Patent Pub. No. WO2012045050; U.S. Pat. Nos. 8,140,168; 7,865,245; 7,774,069; 7,711,433; 7,650,187; 7,571,007; 7,741,734; 7,825,543; 6,591,139; 6,553,263; and 5,350,413; and U.S. Pub. Nos. 2013/0320773; 2013/0127253; 2010/0308939; 2008/027293; and 2010/0102639, the entire contents of which patents and applications are incorporated herein for all purposes.

Wireless Power Transmission System

Power may be transmitted wirelessly by magnetic induction. In various embodiments, the transmitter and receiver are closely coupled.

In some cases "closely coupled" or "close coupling" refers to a system that requires the coils to be very near each other in order to operate. In some cases "loosely coupled" or "loose coupling" refers to a system configured to operate even when the coils have a significant spatial and/or axial separation, and in some cases up to distance equal to or less than the diameter of the larger of the coils. In some cases, "loosely coupled" or "loose coupling" refers a system that is relatively insensitive to changes in physical separation and/or orientation of the receiver and transmitter. In some cases, a loosely coupled system is a highly resonant wireless energy transfer system.

In various embodiments, the transmitter and receiver are non-resonant coils. For example, a change in current in one coil induces a changing magnetic field. The second coil within the magnetic field picks up the magnetic flux, which in turn induces a current in the second coil. An example of a closely coupled system with non-resonant coils is described in International Pub. No. WO2000/074747, incorporated herein for all purposes by reference. A conventional transformer is another example of a closely coupled, non-resonant system. In various embodiments, the transmitter and receiver are resonant coils. For example, one or both of the coils is connected to a tuning capacitor or other means for controlling the frequency in the respective coil. An example of closely coupled system with resonant coils is described in International Pub. Nos. WO2001/037926; WO2012/087807; WO2012/087811; WO2012/087816; WO2012/087819; WO2010/030378; and WO2012/056365, and U.S. Pub. No. 2003/0171792, incorporated herein for all purposes by reference.

In various embodiments, the transmitter and receiver are loosely coupled. For example, the transmitter can resonate to propagate magnetic flux that is picked up by the receiver at relatively great distances. In some cases energy can be transmitted over 3 cm, over 5 cm, over 7 cm, or over 10 cm. In some cases energy can be transmitted over several meters. In some cases energy can be transmitted to a deep body implant. In a loosely coupled system power transfer may not necessarily depend on a critical distance. Rather, the system may be able to accommodate changes to the coupling coefficient between the transmitter and receiver. An example of a loosely coupled system is described in International Pub. No. WO2012/045050, incorporated herein for all purposes by reference.

In various embodiments, the system is able to accommodate ongoing changes to the coupling coefficient between the transmitter and receiver during operation. In the case of an implantable device receiving wireless energy, for example, the relative orientation of the transmitter and receiver is constantly changing. Indeed, sometimes the components can vibrate or move at a rapid pace, which presents challenges to conventional highly-resonant, loosely-coupled systems.

Power may be transmitted wirelessly by radiating energy. In various embodiments, the system comprises antennas. The antennas may be resonant or non-resonant. For example, non-resonant antennas may radiate electromagnetic waves to create a field. The field can be near field or far field. The field can be directional. Generally far field has greater range but a lower power transfer rate. An example of such a system for radiating energy with resonators is described in International Pub. No. WO2010/089354, incorporated herein for all purposes by reference. An example of such a non-resonant system is described in International Pub. No. WO2009/018271, incorporated herein for all purposes by reference. Instead of antenna, the system may comprise a high energy light source such as a laser. The system can be configured so photons carry electromagnetic energy in a spatially restricted, direct, coherent path from a transmission point to a receiving point. An example of such a system is described in International Pub. No. WO2010/089354, incorporated herein for all purposes by reference.

Power may also be transmitted by taking advantage of the material or medium through which the energy passes. For example, volume conduction involves transmitting electrical energy through tissue between a transmitting point and a receiving point. An example of such a system is described in International Pub. No. WO2008/066941, incorporated herein for all purposes by reference.

Power may also be transferred using a capacitor charging technique. The system can be resonant or non-resonant. Exemplars of capacitor charging for wireless energy transfer are described in International Pub. No. WO2012/056365, incorporated herein for all purposes by reference.

The system in accordance with various aspects of the invention will now be described in more detail in connection with a system for wireless energy transfer by magnetic induction. The exemplary system utilizes resonant power transfer. The system works by transmitting power between the two inductively coupled coils. In contrast to a transformer, however, the exemplary coils are not coupled together closely. A transformer generally requires the coils to be aligned and positioned directly adjacent each other. The exemplary system accommodates looser coupling of the coils.

While described in terms of one receiver coil and one transmitter coil, one will appreciate from the description herein that the system may use two or more receiver coils and two or more transmitter coils. For example, the transmitter may be configured with two coils—a first coil to resonate flux and a second coil to excite the first coil. In various embodiments, the system uses a plurality of coils with at least one of the coils configured as a repeater. One will further appreciate from the description herein that usage of "resonator" and "coil" may be used somewhat interchangeably. In various respects, "resonator" refers to a coil and a capacitor connected together. In various respects, "transmitter" and "receiver" refer to coils.

In accordance with various embodiments of this disclosure, the system comprises one or more transmitters configured to transmit power wirelessly to one or more receivers. In various embodiments, the system includes a transmitter and more than one receiver in a multiplexed arrangement. A frequency generator may be electrically coupled to the transmitter to drive the transmitter to transmit power at a particular frequency or range of frequencies. The frequency generator can include a voltage controlled oscillator and one or more switchable arrays of capacitors, a voltage controlled oscillator and one or more varactors, a phase-locked-loop, a direct digital synthesizer, or combinations thereof. The transmitter can be configured to transmit power at multiple frequencies simultaneously. The frequency generator can include two or more phase-locked-loops electrically coupled to a common reference oscillator, two or more independent voltage controlled oscillators, or combinations thereof. The transmitter can be arranged to simultaneously delivery power to multiple receivers at a common frequency.

In various embodiments, the transmitter is configured to transmit a low power signal at a particular frequency. The transmitter may transmit the low power signal for a particular time and/or interval. In various embodiments, the transmitter is configured to transmit a high power signal wirelessly at a particular frequency. The transmitter may transmit the high power signal for a particular time and/or interval.

In various embodiments, the receiver includes a frequency selection mechanism electrically coupled to the receiver coil and arranged to allow the resonator to change a frequency or a range of frequencies that the receiver can receive. The frequency selection mechanism can include a switchable array of discrete capacitors, a variable capacitance, one or more inductors electrically coupled to the receiving antenna, additional turns of a coil of the receiving antenna, or combinations thereof. An example of a suitable switching mechanism is a field effect transistor (FET). FETs can be advantageous because of their low power losses.

In general, most of the flux from the transmitter coil does not reach the receiver coil. The amount of flux generated by the transmitter coil that reaches the receiver coil is described by "k" and referred to as the "coupling coefficient."

In various embodiments, the system is configured to maintain a value of k in the range of between about 0.2 to about 0.01. In various embodiments, the system is configured to maintain a value of k of at least 0.01, at least 0.02, at least 0.03, at least 0.04, or at least 0.05. Even though the coupling coefficient (k) may be small, the exemplary system provides adequate, useful energy transfer through strong coupling and other energy transfer efficiencies. In one example, the system uses highly resonant structures to overcome the small coupling coefficient.

In various embodiments, the coils are physically separated. In various embodiments, the separation is greater than a thickness of the receiver coil. In various embodiments, the separation distance is equal to or less than the diameter of the larger of the receiver and transmitter coil.

Because most of the flux does not reach the receiver, the transmitter coil must generate a much larger field than what is coupled to the receiver. In various embodiments, this is accomplished by configuring the transmitter with a large number of amp-turns in the coil.

Since only the flux coupled to the receiver gets coupled to a real load, most of the energy in the field is reactive. The current in the coil can be sustained with a capacitor connected to the coil to create a resonator. The power source thus only needs to supply the energy absorbed by the receiver. The resonant capacitor maintains the excess flux that is not coupled to the receiver.

In various embodiments, the impedance of the receiver is matched to the transmitter. This allows efficient transfer of energy out of the receiver. In this case the receiver coil may not need to have a resonant capacitor.

Turning now to FIG. 1, a simplified circuit for wireless energy transmission is shown. The exemplary system shows a series connection, but the system can be connected as either series or parallel on either the transmitter or receiver side.

The exemplary transmitter includes a coil Lx connected to a power source Vs by a capacitor Cx. The exemplary receiver includes a coil Ly connected to a load by a capacitor Cy. Capacitor Cx may be configured to make Lx resonate at a desired frequency. Capacitance Cx of the transmitter coil may be defined by its geometry. Inductors Lx and Ly are connected by coupling coefficient k. Mxy is the mutual inductance between the two coils. The mutual inductance, Mxy, is related to coupling coefficient, k.

$$Mxy = k\sqrt{Lx \cdot Ly}$$

In the exemplary system the power source Vs is in series with the transmitter coil Lx so it may have to carry all the reactive current. This puts a larger burden on the current rating of the power source and any resistance in the source will add to losses.

The exemplary system includes a receiver configured to receive energy wirelessly transmitted by the transmitter. The exemplary receiver is connected to a load. The receiver and load may be connected electrically with a controllable switch.

In various embodiments, the receiver includes a circuit element configured to be connected or disconnected from the receiver coil by an electronically controllable switch.

The electrical coupling can include both a serial and parallel arrangement. The circuit element can include a resistor, capacitor, inductor, lengths of an antenna structure, or combinations thereof. The system can be configured such that power is transmitted by the transmitter and can be received by the receiver in predetermined time increments.

In various embodiments, the transmitter coil and/or the receiver coil is a substantially two-dimensional structure. In various embodiments, the transmitter coil may be coupled to a transmitter impedance-matching structure. Similarly, the receiver coil may be coupled to a receiver impedance-matching structure. Examples of suitable impedance-matching structures include, but are not limited to, a coil, a loop, a transformer, and/or any impedance-matching network. An impedance-matching network may include inductors or capacitors configured to connect a signal source to the resonator structure.

In various embodiments, the transmitter is controlled by a controller (not shown) and driving circuit. The controller and/or driving circuit may include a directional coupler, a signal generator, and/or an amplifier. The controller may be configured to adjust the transmitter frequency or amplifier gain to compensate for changes to the coupling between the receiver and transmitter.

In various embodiments, the transmitter coil is connected to an impedance-matched coil loop. The loop is connected to a power source and is configured to excite the transmitter coil. The first coil loop may have finite output impedance. A signal generator output may be amplified and fed to the transmitter coil. In use power is transferred magnetically between the first coil loop and the main transmitter coil, which in turns transmits flux to the receiver. Energy received by the receiver coil is delivered by Ohmic connection to the load.

One of the challenges to a practical circuit is how to get energy in and out of the resonators. Simply putting the power source and load in series or parallel with the resonators is difficult because of the voltage and current required. In various embodiments, the system is configured to adjust the power delivery at the transmitter side based on feedback from the receiver side received. In various embodiments, the system is configured to achieve an approximate energy balance by analyzing the system characteristics, estimating voltages and currents involved, and controlling circuit elements to deliver the power needed by the receiver.

In an exemplary embodiment, the system load power, $P_L$, is assumed to be up to 15 Watts and the operating frequency of the system, f, is 250 kHz. Then, for each cycle the load removes a certain amount of energy from the resonance:

$$e_L = \frac{P_L}{f} = 60 \ \mu J$$

Energy the load removes in one cycle

It has been found that the energy in the receiver resonance is typically several times larger than the energy removed by the load for operative, implantable medical devices. In various embodiments, the system assumes a ratio 7:1 for energy at the receiver versus the load removed. Under this assumption, the instantaneous energy in the exemplary receiver resonance is 420 μJ.

The exemplary circuit was analyzed and the self inductance of the receiver coil was found to be 60 uH. From the energy and the inductance, the voltage and current in the resonator could be calculated.

$$e_y = \frac{1}{2}Li^2$$

$$i_y = \sqrt{\frac{2e_y}{L}} = 3.74A \text{ peak}$$

$$v_y = \omega L_y i_y = 352V \text{ peak}$$

The voltage and current can be traded off against each other. The inductor may couple the same amount of flux regardless of the number of turns. The Amp-turns of the coil needs to stay the same in this example, so more turns means the current is reduced. The coil voltage, however, will need to increase. Likewise, the voltage can be reduced at the expense of a higher current. The transmitter coil needs to have much more flux. The transmitter flux is related to the receiver flux by the coupling coefficient. Accordingly, the energy in the field from the transmitter coil is scaled by k.

$$e_x = \frac{e_y}{k}$$

Given that k is 0.05:

$$e_x = \frac{420 \ \mu J}{0.05} = 8.4 \ mJ$$

For the same circuit the self inductance of the transmitter coil was 146 uH as mentioned above. This results in:

$$i_x = \sqrt{\frac{2e_x}{L}} = 10.7A \text{ peak}$$

$$v_x = \omega L_x i_x = 2460V \text{ peak}$$

From this example one can appreciate the competing factors and how to balance voltage, current, and inductance to suit the circumstance and achieve the desired outcome. Like the receiver, the voltage and current can be traded off against each other. In this example, the voltages and currents in the system are relatively high. One can adjust the tuning to lower the voltage and/or current at the receiver if the load is lower.

Estimation of Coupling Coefficient and Mutual Inductance

As explained above, the coupling coefficient, k, may be useful for a number of reasons. In one example, the coupling coefficient can be used to understand the arrangement of the coils relative to each other so tuning adjustments can be made to ensure adequate performance. If the receiver coil moves away from the transmitter coil, the mutual inductance will decrease, and ceteris paribus, less power will be transferred. In various embodiments, the system is configured to make tuning adjustments to compensate for the drop in coupling efficiency.

The exemplary system described above often has imperfect information. For various reasons as would be understood by one of skill in the art, the system does not collect data for all parameters. Moreover, because of the physical gap between coils and without an external means of communications between the two resonators, the transmitter may have information that the receiver does not have and vice versa. These limitations make it difficult to directly measure and derive the coupling coefficient, k, in real time.

Described below are several principles for estimating the coupling coefficient, k, for two coils of a given geometry. The approaches may make use of techniques such as Biot-Savart calculations or finite element methods. Certain assumptions and generalizations, based on how the coils interact in specific orientations, are made for the sake of simplicity of understanding. From an electric circuit point of view, all the physical geometry permutations can generally lead to the coupling coefficient.

Figure 2:
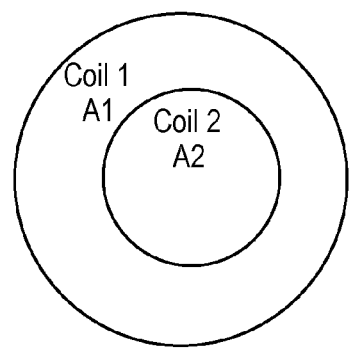
FIG. 2 illustrates the flux generated by a pair of coils.

If two coils are arranged so they are in the same plane, with one coil circumscribing the other, then the coupling coefficient can be estimated to be roughly proportional to the ratio of the area of the two coils. This assumes the flux generated by coil 1 is roughly uniform over the area it encloses as shown in FIG. 2.

Figure 3A:
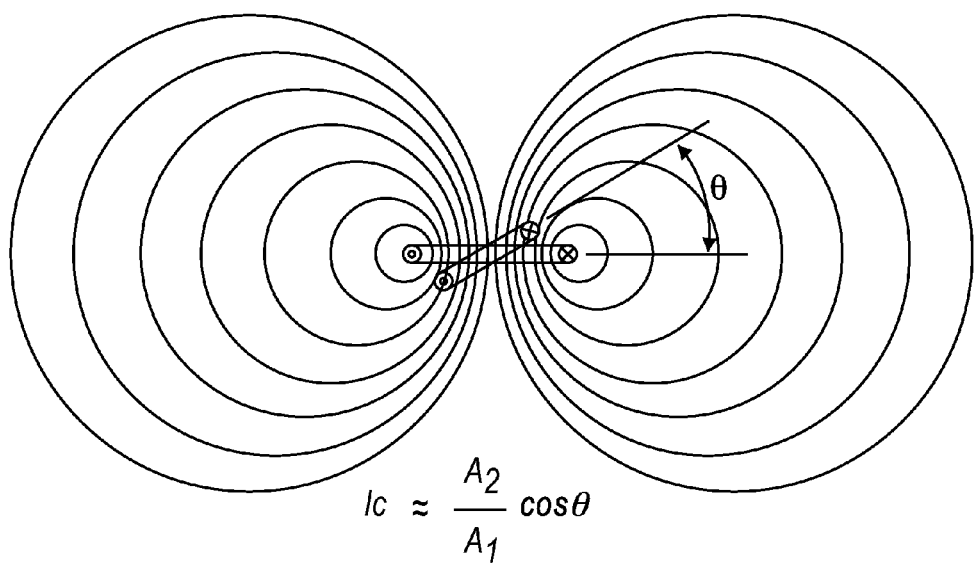
FIGS. 3A-3B illustrate the effect of coil alignment on the coupling coefficient.

If the coils are out of alignment such that the coils are at a relative angle, the coupling coefficient will decrease. The amount of the decrease is estimated to be about equal to the cosine of the angle as shown in FIG. 3A. If the coils are orthogonal to each other such that theta (θ) is 90 degrees, the flux will not be received by the receiver and the coupling coefficient will be zero.

Figure 3B:
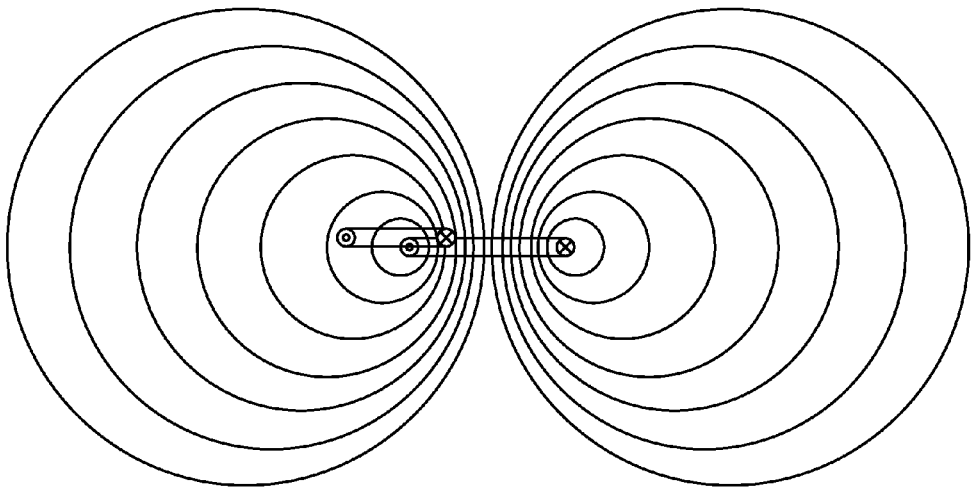

If the coils are arraigned such that half the flux from one coil is in one direction and the other half is in the other direction, the flux cancels out and the coupling coefficient is zero, as shown in FIG. 3B.

A final principle relies on symmetry of the coils. The coupling coefficient and mutual inductance from one coil to the other is assumed to be the same regardless of which coil is being energized.

$$M_{xy}=M_{yx}$$

Transmit and Receive Coils

Transmit and receive coils in conventional wireless power systems typically utilize a rigid, planar design. These rigid and flat coils can be relatively simple and cheap to manufacture. Use of flat coils with fixed shapes also makes tuning the system easier. These advantages, however, can come at the expense of usability in some applications. In the example of an implanted medical device, rigid and flat coils are uncomfortable to wear during use, particularly the transmit coils which must be held against the skin to transmit energy into the patient. The ability to shape the coil based on the anatomy, rather than based on the wireless energy principles as is conventionally done, can greatly improve system performance, usability, and quality of life (QoL) for the patient. With long-term medical devices like a ventricular assist device (VAD), the QoL improvements can be the difference between adoption of the technology or not.

In this disclosure, various coil designs can be implemented in a TET system to improve patient comfort and convenience during use. The embodiments disclosed herein can apply to either transmit resonator coils or receive resonator coils of a TET system, where non-planar and/or malleable/flexible coil designs can advantageously conform to a patient's skin (transmit coil) or to an implantable location within the body (receive coil).

Figure 4B:
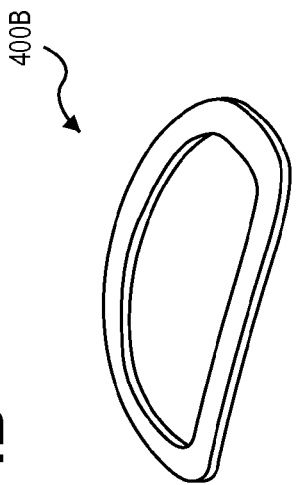
FIGS. 4A-4D illustrate various embodiments of a non-planar and/or malleable resonator coil.
Figure 4D:
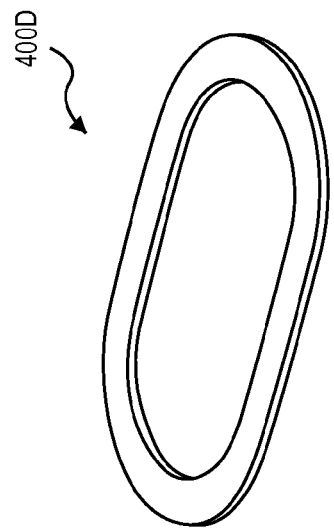
Figure 4A:
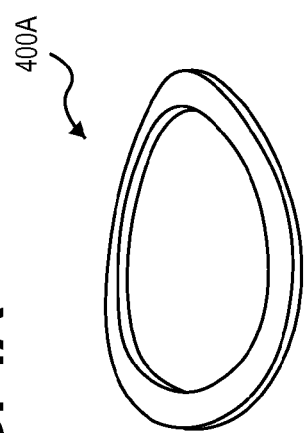
Figure 4C:
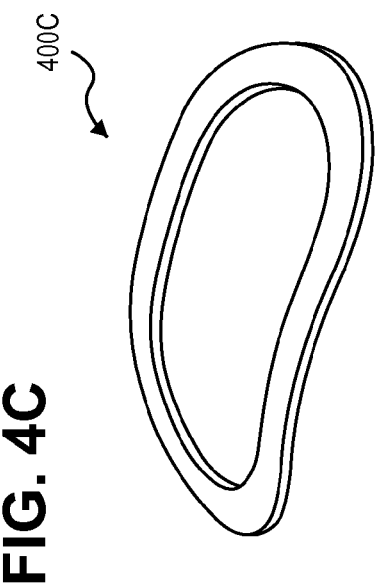

FIGS. 4A-4D illustrate various embodiments of malleable and/or non-planar resonator coils for use in a TET system. In some embodiments, the resonator coil can be a circular coil 400a (FIG. 4A), a rectangular coil 400b (FIG. 4B), or oval/elliptical coils 400c/d (FIGS. 4C-4D). As shown, the embodiments of FIGS. 4A-4C are non-planar, since portions of the coil resonators bow or bend away from a plane defined by the rest of the coil. In various embodiments, the non-planar resonator spans a non-degenerate two-dimensional surface having at least one concave portion. In various embodiments, the resonator has a saddle shape. In various embodiments, the resonator has a curved shape corresponding to the curvature of the lateral abdomen or external oblique abdominal muscles of a patient. Various aspects of the coil shape may be similar to those shown and described in 2013/0127253 to Stark et al., the entire contents of which are incorporated herein for all purposes.

The coil resonators of FIGS. 4A-4D may be rigid and configured to hold a pre-formed shape, or alternatively, the coil resonators may be substantially flexible and malleable and configured to be bendable and formable into any desired shape while still maintaining the ability to transmit/receive wireless energy.

In some embodiments, the coil resonators can be pre-bent or pre-formed to have a particular shape or radius of curvature. For example, if the coil resonator is used as a transmit resonator in a TET system, the coil resonator can be pre-formed to conform to a specific portion of a patient's anatomy. This pre-formed shape can vary depending on the specific application or intended position on the patient's body, or depending on where the receive coil is implanted in the patient. For example, a transmit coil shaped to be placed on a chest of a patient to access an implanted receive coil near the chest may have less pre-formed curvature than a transmit coil shaped to be placed on a side or oblique of the patient to access a receive coil implanted in that area of the patient's body. The exemplary coil in FIG. 4D is shaped to fit to a patient's side, and more specifically, the external oblique muscle area.

In other embodiments, the coil resonators of FIGS. 4A-4D may not have a pre-formed or pre-bent shape, but instead may be flexible and malleable so as to be bent or conformed into any desired shape. For example, the planar or flat coil of FIG. 4D may be bent into the shape of the coil of FIG. 4C. By designing a malleable or shapeable coil for use in a TET system, the individual transmitter and/or receiver coils of the system can be infinitely customizable and conformable to each unique patient. A manufacturer would not need to design an optimal curvature or non-planar coil for each unique application and coil placement, but instead the coil resonators can be easily bent or pressed against a patient's body to perfectly conform to that individual patient's shape.

In various embodiments, the coil is formed to a desired shape before application to the patient. The coil can be shaped by the manufacturer. Alternatively, the coil may be configured so the clinician can set the shape. For example, the coil can includes mechanism to lock in the shape. The coil may include mechanisms (e.g., a relatively stiff member or indexed slide attached to the coil) to set an intermediate shape before final locking. For example, a mechanism can be used for gross adjustment. Thereafter, the clinician can make fine adjustments on the patient.

The coil resonators can be shaped into an elliptical paraboloid or bowl-shape, as shown. The density of the wire windings can be tailored to achieve a particular resonant frequency. In some embodiments, the non-planar coil resonator spans a non-degenerate two-dimensional surface that has at least two concave portions, such as a hyperbolic paraboloid surface. A hyperbolic paraboloid surface is a surface that is shaped like a saddle, with the top of the saddle being one concave portion and the bottom of the saddle being another concave portion. In one embodiment, the concave curvature of one concave portion can be orthogonal to the concave curvature of the other concave portion. It should be noted that in a hyperbolic paraboloid surface, when the concave portions of the surface are extended along the hyperbolic paraboloid surface, the concave portions can extend out to infinite space. In other words, the concavities of the hyperbolic paraboloid surface do not wrap around and do not enclose on themselves.

Surfaces defined by these embodiments are sometimes referred to as non-degenerate quadric surfaces. In addition to the elliptical paraboloid and hyperbolic paraboloid surfaces described above, another exemplary embodiment of a non-planar resonator that spans a surface defined by one of the above equations includes a non-planar resonator that spans a hyperboloid surface. One feature of such surfaces is that these surfaces have a parabolic cross section.

As indicated by the embodiments described above, the phrase that "a resonator spans a non-degenerate two-dimensional surface," and similar derivatives, do not necessary require the resonator to have a solid surface. Instead, as used herein, the phrase that a resonator spans a non-degenerate two-dimensional surface can mean that the resonator forms an outline of such a surface, or mean that the resonator has such a surface. Furthermore, it should be noted that the phrase that "a resonator spans a non-degenerate two-dimensional surface," and similar derivatives, also mean that the shape of the resonator may have minor features or deformalities that may deviate from such a surface, without departing from the spirit of the present invention. For example, with respect to the embodiment with the elliptical paraboloid bowl-shaped surface, the resonator may have a flat bottom instead of a curved bottom, or the sidewall may have one or more minor dimple indentations. It should be understood that such minor features or deformalities do not detract away from the scope and spirit of the exemplary embodiments.

While resonators have been used in wireless energy transfer systems to extend the communication/transfer range of the systems, the systems that use planar resonators are susceptible to changes in the relative orientation of the resonators with respect to each other. A comparison of a system that uses a non-planar resonator to a system that uses a planar resonator with both systems having the same separation distance and rated for the same output power may be as follows. The amount of energy that is received at the receiver in the non-planar resonator system in a particular direction can potentially be less than the amount of energy that is received at the receiver in a planar resonator system when the transmitter and receiver resonators are parallel to each other. In an exemplary embodiment, the amount of energy that is received in the non-planar resonator system can be about 25% of the amount of energy that is received in the planar resonator system when the planar resonator system is arranged in its preferred orientation (when the transmitter and receiver resonators are parallel to each other). However, although a planar resonator may be able to transfer more power in a single preferred orientation, the amount of energy that a planar resonator system can transfer drops off dramatically when the system is arranged in other orientations and can drop to zero when the orientation of the transmitter and receiver resonators are arranged orthogonal to each other.

By using a non-planar resonator that spans a surface area occupying three spatial dimensions, the same transmitter resonator is able to couple or transfer energy to a non-planar receiver resonator over a wider range of spatial orientations as compared to a receiver unit having a planar resonator. Similarly a non-planar transmitter resonator is able to couple or transfer more energy to a receiver unit compared to a transmitter unit with a planar resonator. Hence, at a given separation distance D that is within an operating range of an omni-orientational wireless energy transfer system, there is no requirement that the resonators have to be placed in any particular orientation with respect to each other in order to transfer a meaningful amount of power required to power or recharge the device load. In one exemplary embodiment, the system is able to achieve a power transfer between the transmitter resonator and the receiver resonator at a given separation distance D that is at least 25% of a maximum power transfer (compared to a planar receiver resonator) at that given separation distance D, regardless of the orientation of the transmitter resonator relative to the receiver resonator.

Figure 5:
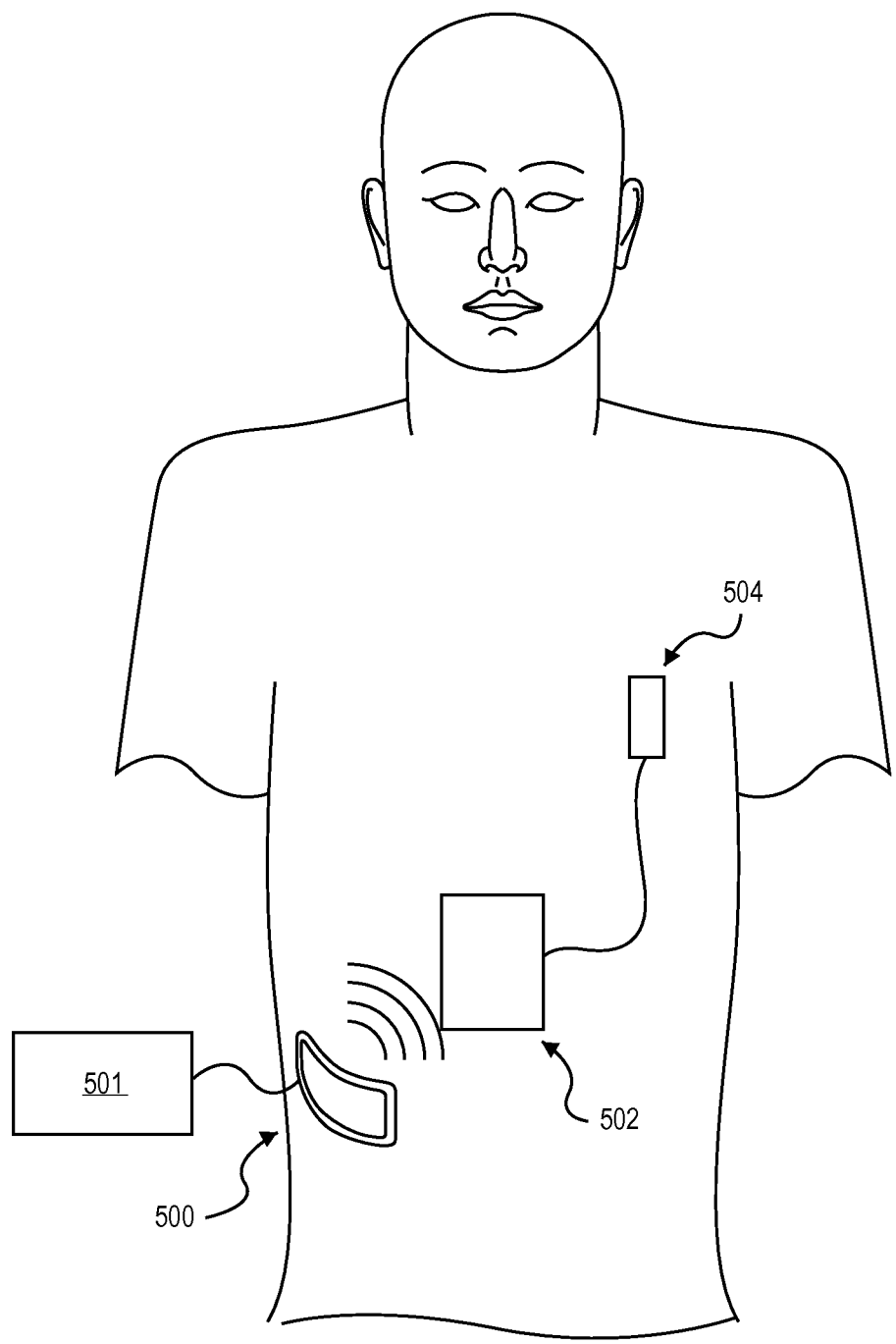
FIG. 5 shows a non-planar resonator coil conforming to the body of a patient.

FIG. 5 illustrates one embodiment of a transmit resonator coil 500 positioned on an exterior portion of a patient. In FIG. 5, the transmit coil can be either a pre-bent or pre-shaped resonator coil configured to conform to the anatomy of the patient, or alternatively, the transmit coil can be a malleable or flexible resonator coil configured to be bendable to conform to the anatomy of the patient.

The transmit resonator coil 500 can be coupled to a power supply 501, such as a frequency generator, and can be configured to transmit wireless energy to an implanted receive resonator coil 502 in the patient. In some embodiments, the receive resonator coil can be electrically coupled to a load, such as an implanted medical device 504 (e.g., a heart pump), to provide energy for the operation of the medical device. In some embodiments, the receive resonator coil can also be either pre-bent or malleable, so as to conform to the portion of the anatomy in which it is implanted.

Figure 6A:
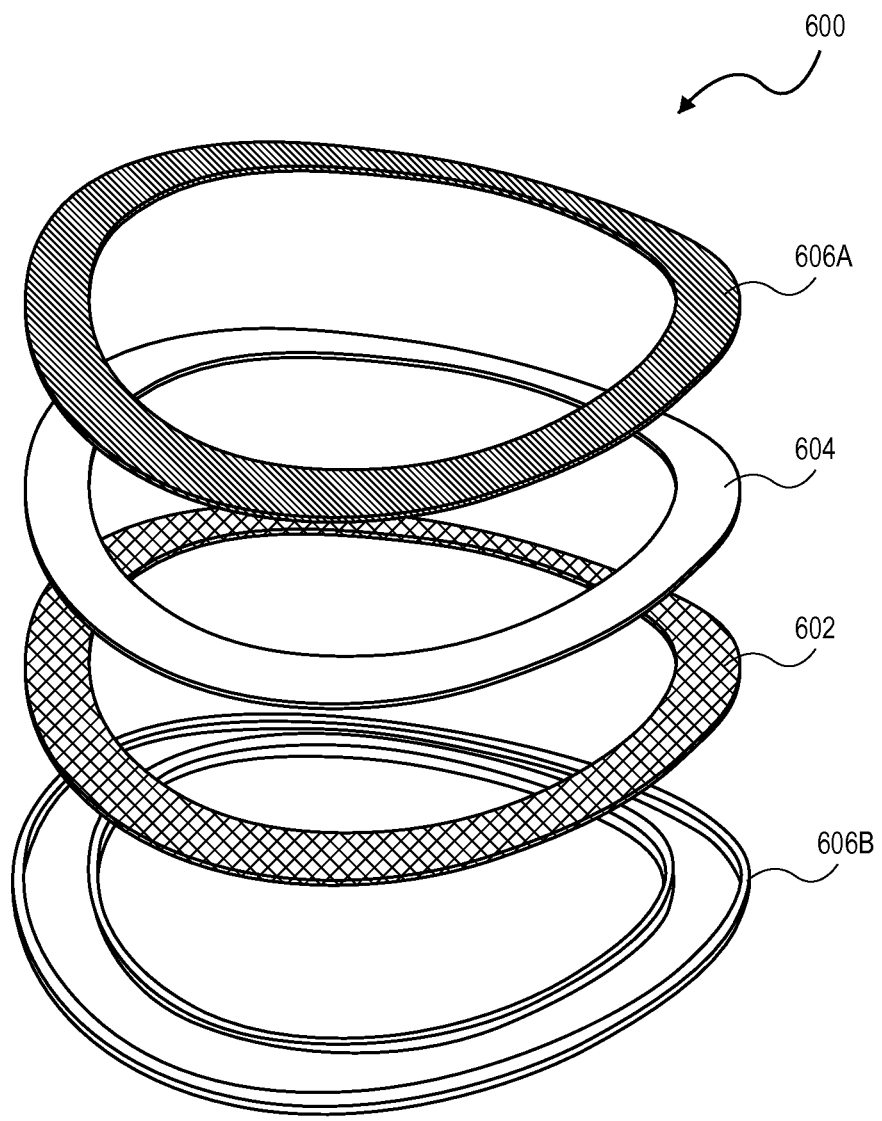
FIGS. 6A-6C illustrate various exploded and cross sectional views of a resonator coil.

FIG. 6A illustrates an exploded view of one embodiment of a non-planar and/or malleable resonator coil 600. The construction shown in FIG. 6A can apply to any of the resonator coils in this disclosure, such as the coils from FIGS. 4A-4D and 5 above. The malleable resonator coil 600 can also be used as a transmit coil resonator, a receive coil resonator, or both. Resonator coil 600 can include a flexible conductor layer or wire coil 602, a ferrite layer 604, and a housing or shell (shown here in two sections as housing 606a and 606b). In embodiments where the resonator coil is flexible or malleable, the housing can be made from a soft, flexible or bendable material such as silicone, polyurethane, epoxy, foam, or even fabric. In the illustrated embodiment, the housing comprises two sections 606a and 606b, and one of the parts of the housing can include a groove or cutout to provide containment for the wire coil and ferrite layer. In other embodiments, the housing comprises a single section, such as a flexible epoxy, polyurethane, or rubber-like material that is applied to surround the wire coil and ferrite layer.

Figure 6B:
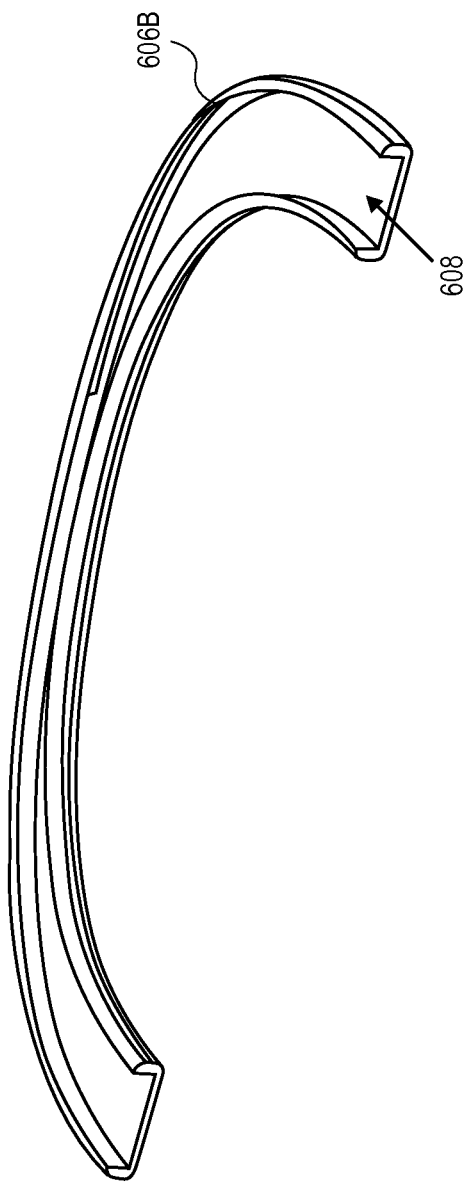
Figure 6C:
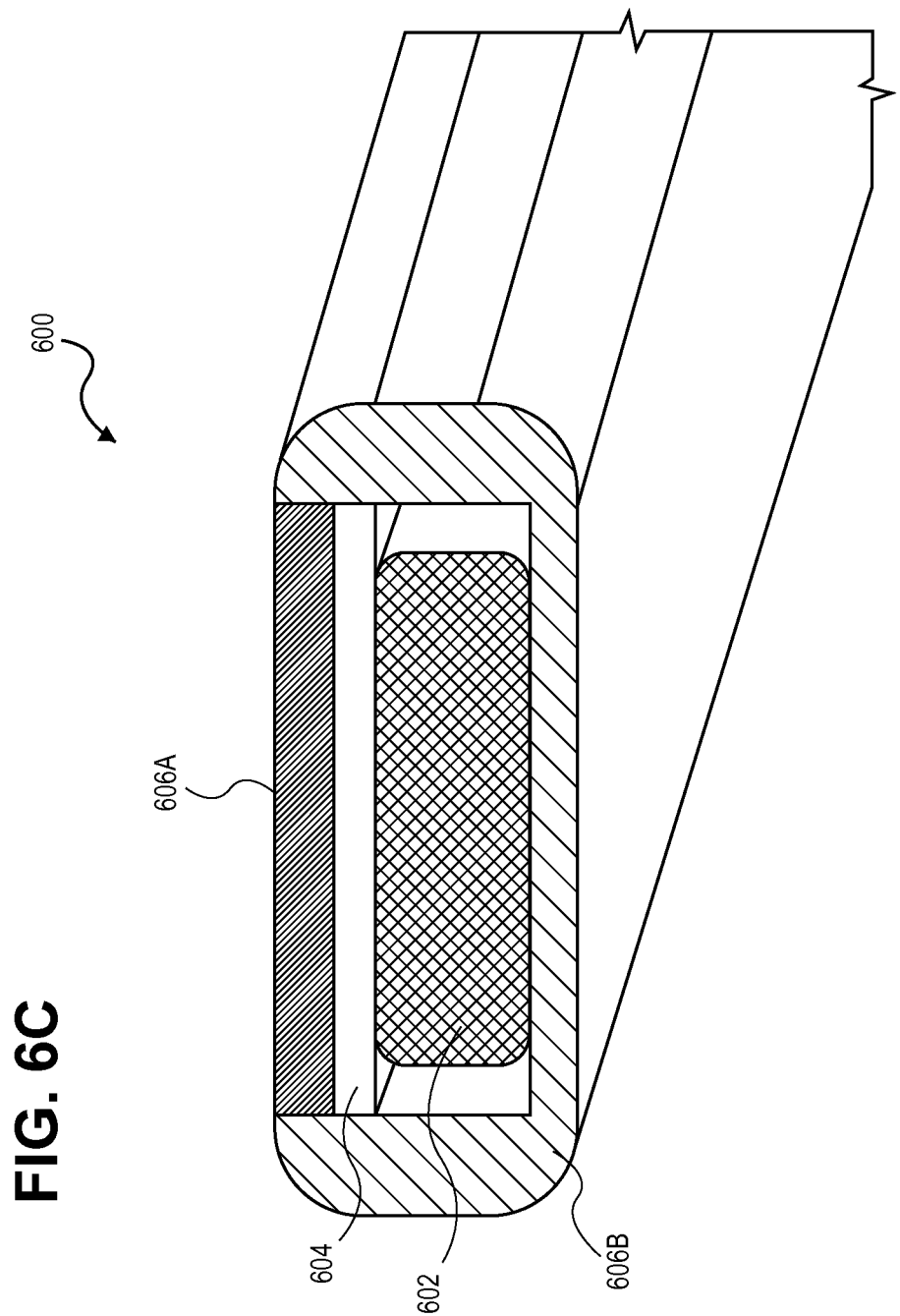

FIG. 6B illustrates a close up, cross-sectional view of housing section 606b having groove 608. FIG. 6C illustrates a cut-away view of a fully constructed resonator coil 600, including wire coil layer 602, ferrite layer 604, and housing sections 606a and 606b. It should be understood that in other embodiments the housing sections can comprise a single flexible layer that surrounds the coil layer and ferrite layer. In this embodiment, the ferrite layer 604 is shown positioned above the wire coil 602. The ferrite layer is configured to prevent magnetic flux from flowing in undesired directions. Thus, in this example, the ferrite layer would prevent magnetic flux from the wire coil from flowing past the ferrite layer (towards the top of the page, e.g., the center of the patient's body). The ferrite layer can be optionally removed in some embodiments, where preventing magnetic flux from flowing in undesired directions is not needed.

Figure 7:
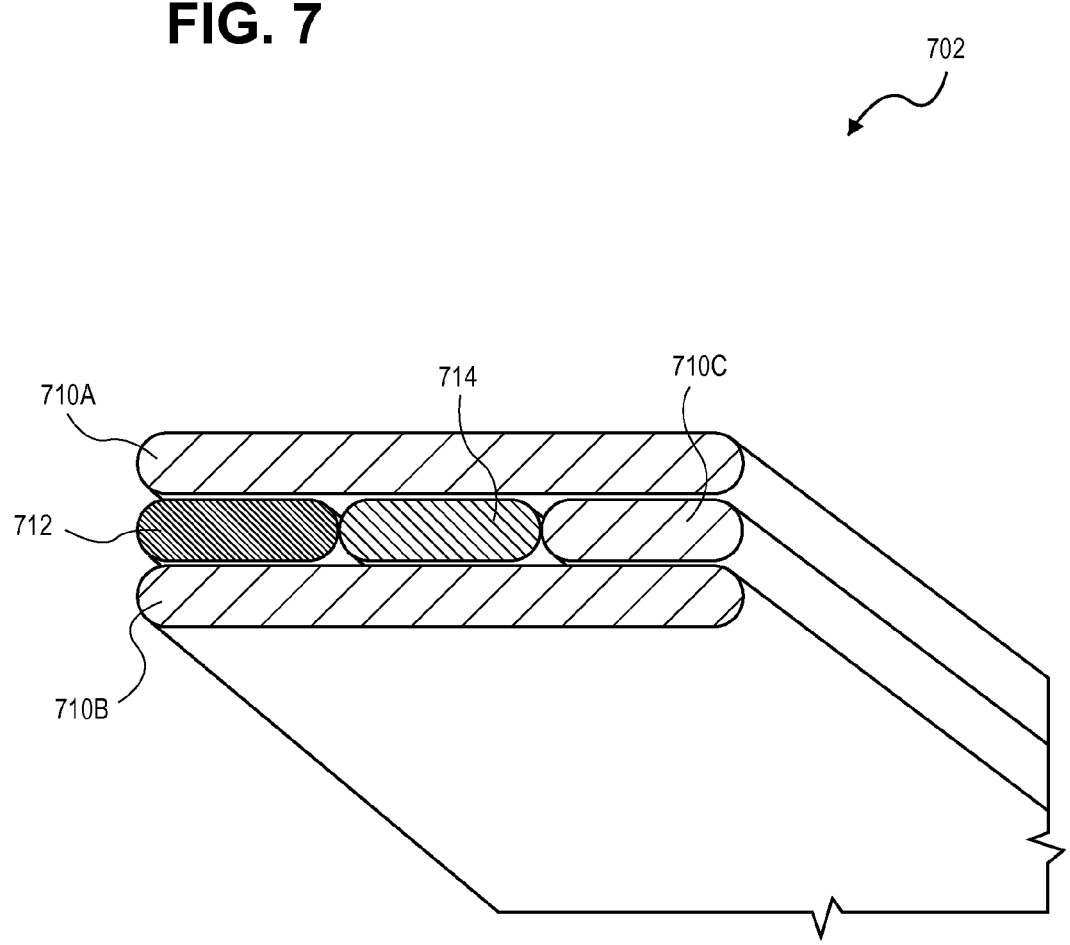
FIG. 7 shows one embodiment of a wire coil layer.

FIG. 7 illustrates an alternate embodiment of a wire coil layer 702. In the embodiment of FIGS. 6A-6B, the wire core layer 602 comprises a single conductor or wire layer. However, in this embodiment, the wire coil layer 702 can comprise multiple layers or different types of coils. In one embodiment, the wire coil layer 702 of FIG. 7 can include a plurality of transmitter coils 710a, 710b, and 710c, and can further comprise an exciter coil 712 and a receive coil 714. Each of the transmitter coils can be configured to operate at different parameters (e.g., different frequencies, power levels, etc.), or alternatively, the plurality of transmitter coils can be driven together. The excitation coil can be used to cause the transmitter coils to resonate. The receive coil can be used to receive wireless power or signals from another resonator coil, for example. It should be understood that any combination or number of layers of coils can be used. For example, other embodiments could include multiple receive coils and/or multiple exciter coils. The wire coil layer 702 of FIG. 7 can be incorporated into the designs of FIGS. 4A-4D, FIG. 5, or FIGS. 6A-6C above (for example, by substituting wire core layer 702 of FIG. 7 in for wire coil layer 602 of FIG. 6).

The various resonator constructions described above provide for a conformable lamination of components that can be configured to follow the contours of the human body. In some embodiments, the spaces between individual layers (coil, ferrite, etc.) or between the separate layers of coils can include a "slip sheet" or thin film, such as a PTFE film, to allow for adjacent movement between the different layers and therefore promote and enable formability and malleability of the resonator. In some embodiments, the spaces or gaps between coils and the other resonator components can be filled with silicone or other similar materials to stabilize the resonator in a chosen coil plane or shape. In another embodiment, spacers may be used between the resonator components to improve electrical performance or allow for slippage between adjacent layers. In some embodiments, the spaces or gaps between coils and the other resonator components are filled with air and/or another fluid.

Figure 8:
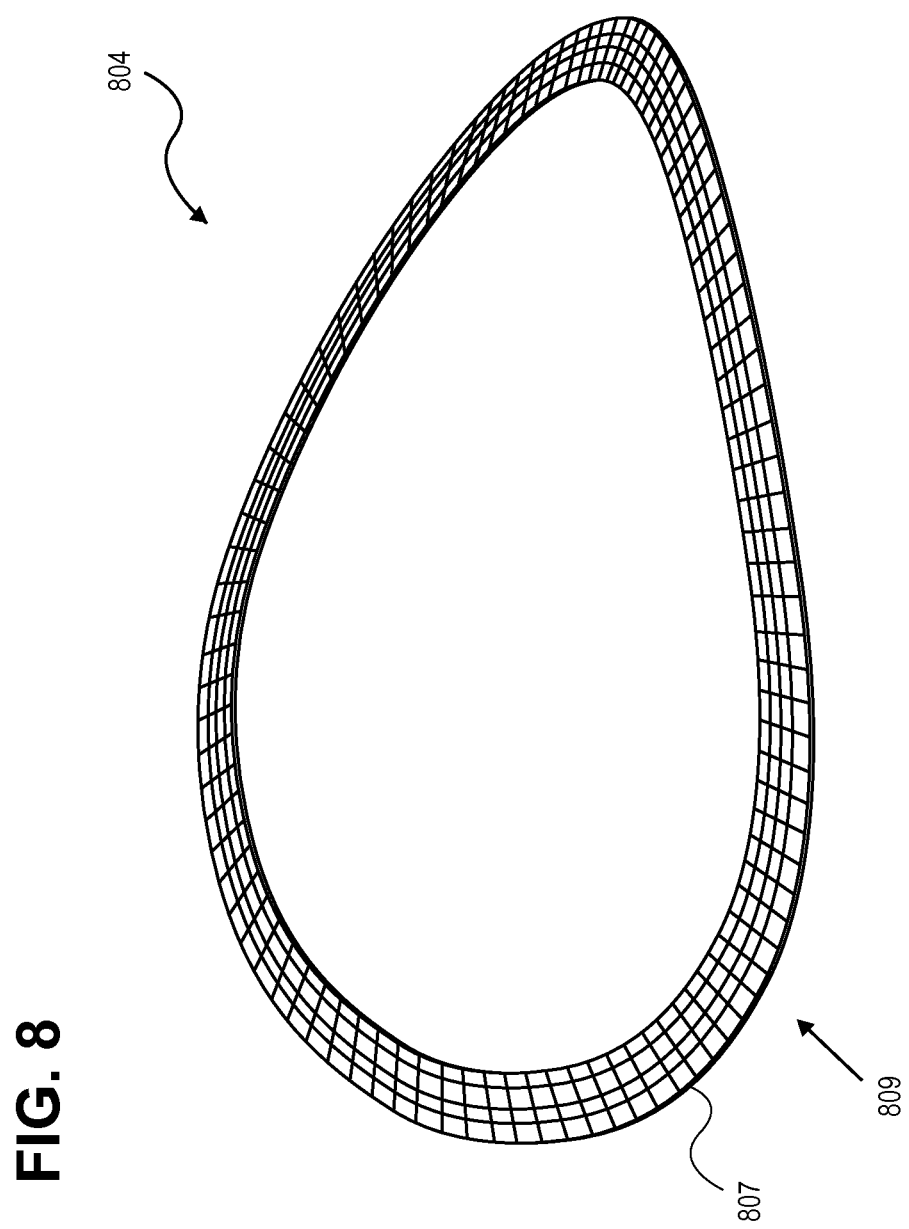
FIG. 8 shows one embodiment of a flexible ferrite layer.

Since ferrite materials are typically hard and brittle, the ferrite layer in the resonator (such as ferrite layer 604 in FIG. 6A) should be specifically designed to allow for the resonator to take on a non-planar or bendable configuration, if the coil is intended to shaped after manufacture. In some embodiments, where the resonator is pre-formed or pre-shaped to conform to a patient, the ferrite layer can be a solid, machined layer of ferrite cut to achieve the curved shape. However, in other embodiments, such as in the case of a malleable resonator, the ferrite layer must be able to accommodate bending and shaping, so a single rigid layer of ferrite will not suffice. Referring to FIG. 8, in one embodiment the ferrite layer 804 can comprise a plurality of ferrite beads or tiles 807 bonded onto a flexible substrate 809. In this embodiment, several small ferrite beads or tiles can be bonded onto a flexible substrate allows the ferrite layer 804 to bend and conform to the body with the rest of the components in the resonator. One will appreciate that the number and shape of the ferrite tiles can be modified based on design requirements, for example, the minimum bend radius. In various embodiments, the coil comprises a plurality of ferrite members with different shapes and sizes. In one embodiment, the flexible substrate can comprise an adhesive film cut to the correct final shape (e.g., acrylic double stick adhesive film). In another embodiment, the flexible substrate can comprise a silicone film. This would allow for bonding to the other silicone potting and molded silicone ring components in the resonator assembly.

Figure 9:
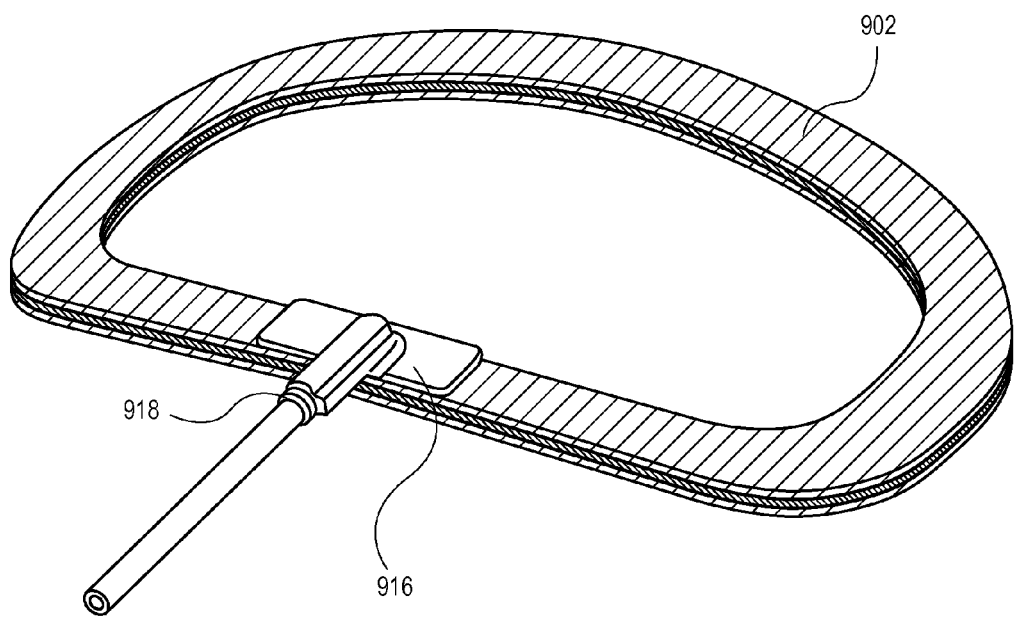
FIG. 9 illustrates a strain relief coupled to a wire coil layer of a resonator.

Referring now to FIG. 9, the resonator may include a strain relief 916 that allows a robust and cosmetic transition from the wire coil layer 902 to a cable jacket 918. The strain relief can reduce the incidence of conductor failure due to customer use or abuse. In some embodiments, the cable jacket can be non-silicone (e.g., urethane, LDPE, Teflon, PVC, etc.) so that the silicone potting does not bond to the conductors, thereby allowing some slippage and movement and allowing more flexibility to the TET coil assembly. In another embodiment, the cable jacket can be silicone, so that the silicone potting of the coil assembly does bond to the conductors, thereby reducing any relative motion of the conductors within the assembly. This can make the formed shape less flexible once in its final molded curved shape, reduce wear due to abrasion from relative motion of conductors and silicone encapsulation, reduce any triboelectric effects due to relative motion of conductor and silicone encapsulation, improve fatigue life, and reduce the change of moisture ingress.

Methods of using the malleable resonator coils described herein to transmit and receive wireless energy can include conforming a malleable transmitter coil to a patient, transmitting wireless energy from the malleable transmitter coil into the patient, receiving the wireless energy with a receiver coil implanted in the patient, and delivering the received energy to a device load in the patient. In various embodiments, the conforming comprises making a gross adjustment of the coil (e.g. based on the patient's body size) and then fine tuning the coil shape. The conforming can be done by the clinician. Alternatively, the conforming can be done by the manufacturer based on patient information provided by the clinician to the manufacturer (e.g. a patient model). Methods can also include transmitting wireless energy from a transmitter coil into a patient, receiving the wireless energy with a malleable receiver coil implanted in the patient, and delivering the received energy to a device load in the patient.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Various modifications to the above embodiments will be readily apparent to those skilled in the art, and the generic principles defined herein may be applied to other embodiments without departing from the spirit or scope of the invention. Thus, it is intended that the scope of the present invention herein disclosed should not be limited by the particular disclosed embodiments described above, but should be determined only by a fair reading of the claims that follow.

In particular, materials and manufacturing techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the commonly used phrase "and/or." It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

What is claimed is:

1. A resonator of a wireless power transfer system, comprising:
    a flexible housing comprising a top section and a bottom section, the bottom section comprising a first sidewall, a second sidewall, and a bottom wall that collectively define a groove, the top section extending between the first and second sidewalls;
    a malleable conductor layer disposed in the groove of the bottom section of the housing, the malleable conductor layer contacting the bottom wall and spaced apart from the first and second sidewalls; and
    a flexible ferrite layer disposed in the groove of the bottom section of the housing and extending between the first and second sidewalls, the flexible ferrite layer disposed between the top section of the flexible housing and the malleable conductor layer, the malleable conductor layer disposed between the bottom section of the flexible housing and the flexible ferrite layer;
    wherein the resonator is malleable, and wherein the flexible housing encloses the malleable conductor layer and the flexible ferrite layer.

2. The resonator of claim 1, wherein a thin film is positioned between the malleable conductor layer and the ferrite layer.

3. The resonator of claim 2, wherein the thin film is a PTFE film.

4. The resonator of claim 1, wherein the flexible ferrite layer comprises a plurality of ferrite beads disposed on a flexible substrate.

5. The resonator of claim 1, wherein the flexible ferrite layer comprises a plurality of ferrite tiles disposed on a flexible substrate.

6. The resonator of claim 1, wherein the flexible ferrite layer comprises a plurality of ferrite tiles having different shapes and sizes.

7. The resonator of claim 1, wherein the flexible ferrite layer comprises at least two sections, a first section having a first minimum bend radius, and a second section having a second minimum bend radius smaller than the first minimum bend radius.

8. The resonator of claim 1, wherein the malleable conductor layer comprises a resonator coil, and wherein the flexible housing, malleable conductor layer, and flexible ferrite layer each have an annular ring shape to cooperatively define a central aperture extending through the resonator.

9. The resonator of claim 8, wherein the resonator coil is coupled to a power supply and configured to transmit wireless energy.

10. The resonator of claim 1, wherein the malleable conductor layer comprises at least one transmit coil and at least one receive coil.

11. The resonator of claim 1, wherein the malleable conductor layer comprises at least one transmit coil, at least one receive coil, and at least one exciter coil.

12. The resonator of claim 1, wherein the housing comprises silicone.

13. The resonator of claim 1, further comprising a strain relief coupled to the malleable conductor layer, and a cable jacket coupled to the strain relief.

14. The resonator of claim 1, wherein the housing comprises a circular shape.

15. The resonator of claim 1, wherein the housing comprises a rectangular shape.

16. The resonator of claim 1, wherein the housing comprises an elliptical shape.

17. The resonator of claim 1, wherein the resonator is bendable into a non-planar configuration.

* * * * *